United States Patent
Wang et al.

[11] Patent Number: 5,878,332
[45] Date of Patent: Mar. 2, 1999

[54] MULTIPLE FREQUENCY RF TRANSCEIVER

[75] Inventors: Nanlei Larry Wang, Palo Alto; Ronald Patrick Green, Santa Clara, both of Calif.

[73] Assignee: EIC Enterprises Corporation, Tortola, Virgin Islands (Br.)

[21] Appl. No.: 797,228

[22] Filed: Feb. 7, 1997

[51] Int. Cl.$^6$ ...................................................... H04B 1/40
[52] U.S. Cl. ........................... 455/84; 455/103; 455/339; 455/553
[58] Field of Search .................. 455/78, 81, 82, 455/83, 84, 86, 575, 552, 553, 103, 127, 266, 339, 340, 102, 142, 77, 422, 426, 131; 375/216

[56] References Cited

U.S. PATENT DOCUMENTS

| | | | |
|---|---|---|---|
| 2,447,392 | 8/1948 | Byrne | 250/13 |
| 4,464,636 | 8/1984 | Dobrovolny | 455/340 |
| 4,580,289 | 4/1986 | Enderby | 455/340 |
| 5,023,933 | 6/1991 | Karkota, Jr. | 455/339 |
| 5,276,914 | 1/1994 | Ishizuka et al. | 455/83 |
| 5,406,615 | 4/1995 | Miller, II et al. | 455/552 |
| 5,557,642 | 9/1996 | Williams | 455/339 |
| 5,584,056 | 12/1996 | Kim | 455/266 |
| 5,642,378 | 6/1997 | Denheyer et al. | 455/553 |
| 5,697,069 | 12/1997 | Bohm et al. | 455/83 |
| 5,732,330 | 3/1998 | Anderson et al. | 455/84 |
| 5,758,276 | 5/1998 | Shirakawa et al. | 455/339 |
| 5,768,691 | 6/1998 | Matero et al. | 455/84 |

*Primary Examiner*—Nguyen Vo
*Assistant Examiner*—Lester G. Kincaid
*Attorney, Agent, or Firm*—Townsend and Townsend and Crew LLP; Henry K. Woodard

[57] ABSTRACT

An RF transceiver operable in two separate frequency bands has transmitter and receiver elements with broadband components to provide a flat frequency response across the two separate operating frequency bands. The broadband transmitting and receiving elements are utilized with other narrow band components which are designed for operating in either the first frequency band or the second frequency band. The use of common components for operating in both frequency bands reduces part count and cost along with reduced size and weight.

14 Claims, 2 Drawing Sheets

MULTIPLE FREQUENCY RF TRANSCEIVER

BACKGROUND OF THE INVENTION

This invention relates generally to radio frequency (RF) transmitters and receivers, and more particularly the invention relates to an RF transmitter/receiver (transceiver) which operates at multiple carrier frequencies.

Wireless transceivers, such as used in cellular phone systems, operate in assigned frequency ranges. Cellular systems in the U.S. operate in the 800–950 MHz range while PCS operates in 1800–2000 MHz. As new frequency bands are assigned, the transceiver must be capable of operating in different frequency ranges. Heretofore, in operating in two or more frequency ranges, two or more frequency RF transceivers have been required, with these transceivers designed for a particular frequency or frequency band. For two frequency bands, this approach essentially doubles the cost of the RF transceiver and also doubles the printed circuit board area, design cycle, and parts count. This is contrary to the need in the wireless market for low cost, small size, and light weight.

SUMMARY OF THE INVENTION

In accordance with the present invention, a transceiver is provided with transmitter and receiver elements having broadband components with a flat frequency response across at least two separate operating frequency bands. These transmitter and receiver elements are utilized with other components which must be designed for operation in either the first frequency band or the second frequency band. The use of common components for operation in both frequency bands reduces part count and cost along with reduced size and weight.

In preferred embodiments, the broadband components comprise heterojunction bipolar transistors such as gallium arsenide (GaAs) or other high-frequency transistor devices. The switching of the broadband components between first frequency band elements and second frequency band elements employs FET switches to reduce circuit complexity and current consumption. Advantageously, the FET switches and the heterojunction bipolar transistors can be integrated in the same semiconductor chip.

The invention and objects and features thereof will be more readily apparent from the following detailed description and dependent claims when taken with the drawings.

DETAILED DESCRIPTION OF THE PREFERRED EMBODIMENT

Figure 1:
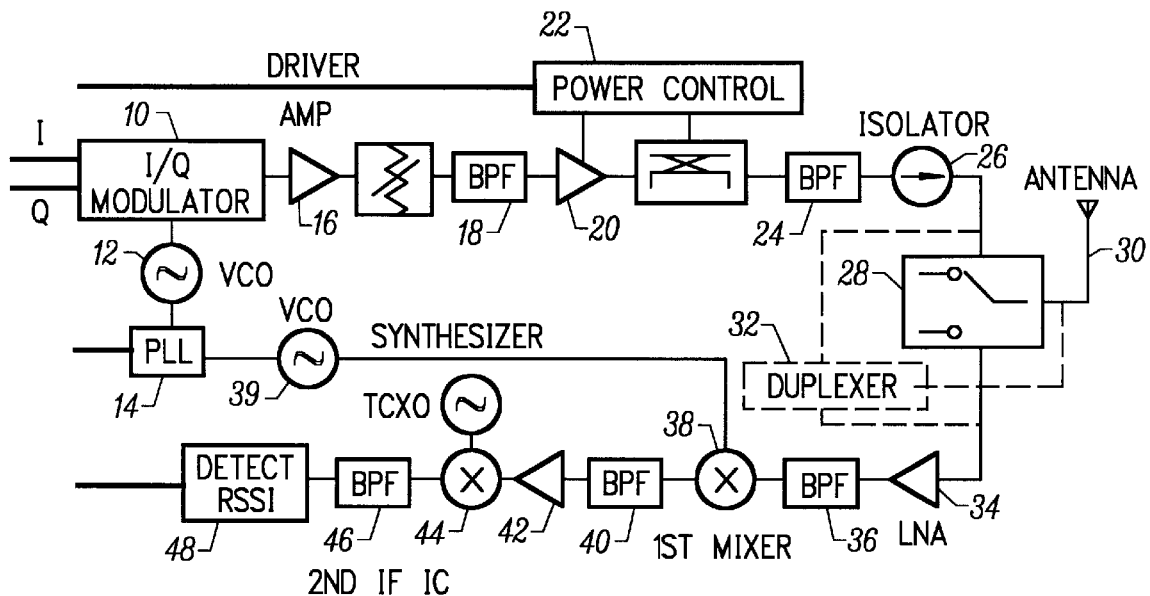
FIG. 1 is a functional block diagram of a conventional RF transceiver.

FIG. 1 is a functional block diagram of a conventional RF transceiver for wireless applications. Typically, for quadrature phase signal transmission and reception, a modulator 10 driven by a voltage controlled oscillator 12 controlled by phase lock loop 14 modulates in phase (I) and quadrature phase (Q) signals which are then amplified by a variable gain amplifier 16 and passed through a first bandpass filter 18 to a power amplifier 20. Amplifier 20 is controlled by a power controller 22 which interfaces with a base band controller. The amplified modulated signals are then passed through a second bandpass filter 24 tuned to the operating frequency of the transceiver, and the filtered signals are then passed through an optional isolator 26 and switch 28 to an antenna 30 for transmission. Signals received by antenna 30 are passed through switch 28 to a low noise amplifier 34 and bandpass filter 36 to a mixer 38 driven by a voltage controlled oscillator 39. The switch 28 can be replaced by a duplexer 32 in certain communication systems. The output of mixer 38 is then passed through a bandpass filter 40 and amplifier 42 to a second mixer 44 for the recovery of an intermediate frequency (IF) received signal. The IF signal is then passed through bandpass filter 46 to the baseband detector 48.

In the traditional approach, all elements of the transceiver are designed for a specific frequency band, and as a new frequency band is assigned, a separate RF transceiver, having its own antenna, is provided for the new frequency band. This approach essentially doubles the size and port counts of the RF transceiver.

In accordance with the present invention, broadband components with flat frequency response are incorporated into the transceiver along with circuit elements designed for specific frequency bands. Thus, dual frequency components can be selectively switched with specific frequency components of the transceiver to accommodate multiple frequency operation. The broadband components preferably employ heterojunction bipolar transistors, such as gallium arsenide or other III-V semiconductor devices, and field effect transistors (FET) are integrated on the same semiconductor die to provide switches.

Figure 2:
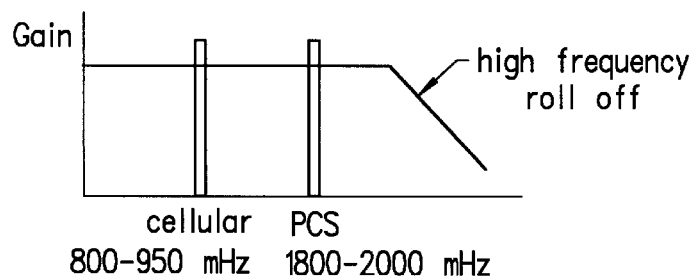
FIG. 2 is a graph illustrating two operating frequency bands for an RF transceiver.
Figure 3:
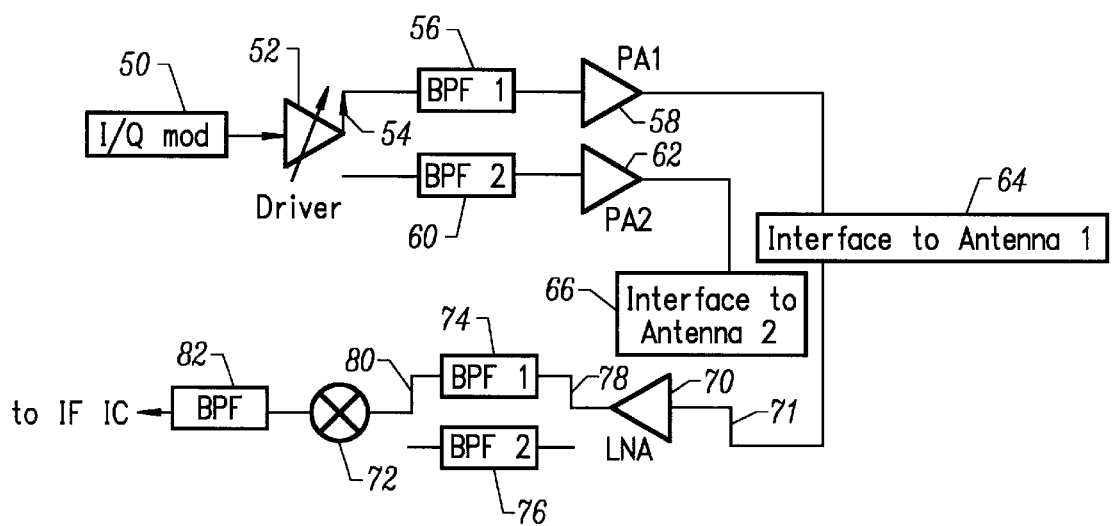
FIG. 3 is a functional block diagram of an RF transceiver in accordance with one embodiment of the present invention which is operable in the frequency bands illustrated in FIG. 2.

Consider FIG. 2 which is a frequency versus gain plot for a wireless transceiver operating in a cellular system (800–950 MHz) and the PCS system (1800–2000 MHz). A transceiver operable in these two frequency bands will have some components which are frequency band specific such as bandpass filters, duplexer, power amplifier, synthesizer and antenna. However, other components of the transceiver can be made with a flat frequency response over the dual frequency bands. FIG. 3 is a functional block diagram of a transceiver in accordance with one embodiment of the present invention. In this embodiment, the I/Q modulator 50, variable gain driver amplifier 52, and switch 54 in the transmitter portion have a flat gain over a broad frequency range, such as illustrated in FIG. 2. Bandpass filter 56 and power amplifier 58 along with a bandpass filter 60 and power amplifier 62 are designed for specific frequency bands, and switch 54 switches the broad band components 50, 52 according to the desired operating frequency. Each power amplifier 58, 62 is connected to a separate antenna through interface units 64, 66. Similarly, in the receiver portion of the transceiver, the low noise amplifier 70 and the first mixer 72 can have a flat frequency response over the desired bands of the bandpass filters 74, 76, which are selectively connected between the low noise amplifier 70 and first mixer 72 by means of switches 78, 80. The low noise amplifier 70 can receive signal from either antenna 1 or antenna 2 by a switch 71. Bandpass filter 82 connects the output of the first mixer 72 to the common IF circuitry.

Since the frequency band shared components have the same performance in both bands, they can be used in either band. RF switches are required to interface the broadband components to specific band components such as the bandpass filters.

If the filters or duplexer or any frequency specific parts have different performance at different frequency bands, the overall performance can be compensated by the variable gain driver or the margin of the broadband components. For example, if the power amplifiers have different gain, the variable gain driver amplifier can provide enough power for both frequency bands. The variable gain amplifier will be tuned to a lower output power for the power amplifier with higher gain/lower input driving power. If the receiver bandpass filters have different insertion loss, the low noise amplifier and the first mixer can be designed with higher margin to compensate for such variations.

The transceiver in accordance with the invention is readily implemented in a single integrated circuit through use of III-V heterojunction bipolar transistors and field effect transistor switches. While the invention has been described with reference to a specific embodiment, the description is illustrative of the invention is not to be construed as limiting the invention. Various modifications and applications may occur to those skilled in the art without departing from the true spirit and scope of the invention as defined by the appended claims.

What is claimed is:

1. An RF transceiver operable in at least two separate frequency bands comprising:
   a) a modulator for modulating an input signal;
   b) a variable gain amplifier for receiving and amplifying a modulated signal from said modulator;
   c) a first bandpass filter and a first power amplifier for receiving an amplified modulated signal in a first frequency band from said variable gain amplifier;
   d) a second bandpass filter and a second power amplifier for receiving an amplified modulated signal in a second frequency band from said variable gain amplifier; and
   e) a first RF switch for selectively applying an amplified modulated signal from said variable gain amplifier to said first bandpass filter and to said second bandpass filter depending on frequency band of the amplified modulated signal, said modulator and said variable gain amplifier comprising broadband components with a flat frequency response across both said first frequency band and said second frequency band.

2. The RF transceiver as defined by claim 1, wherein said input signal has in-phase and quadrature phase components.

3. The RF transceiver as defined by claim 1, and further including first and second antennas, a first interface connecting said first bandpass filter to said first antenna, and a second interface connecting said second bandpass filter to said second antenna.

4. The RF transceiver as defined by claim 1, and further including:
   an antenna;
   a low noise amplifier for amplifying a transmitted signal received by said antenna;
   a third bandpass filter tuned to said first frequency band;
   a fourth bandpass filter tuned to said second frequency band;
   a mixer for receiving signals from said third bandpass filter and from said fourth bandpass filter and providing an IF frequency signal;
   IF tuned detector circuitry for receiving and detecting signals from said mixer;
   a second RF switch for selectively applying an amplified signal from said low noise amplifier to said third bandpass filter and to said fourth bandpass filter depending on frequency band of the amplified signal; and
   a third RF switch for selectively applying signals from the third and fourth bandpass filters to said mixer.

5. The RF transceiver as defined by claim 4, wherein said low noise amplifier comprises broadband components with a flat frequency response across both of said first frequency band and said second frequency band.

6. The RF transceiver as defined by claim 5 and further including first and second antennas, a first interface connecting said first bandpass filter to said first antenna, a second interface connecting said second bandpass filter to said second antenna.

7. The RF transceiver as defined by claim 6 and further including a fourth RF switch for selectively applying signals from said first and second antennas to said low noise amplifier.

8. The RF transceiver as defined by claim 7, wherein said broadband components include heterojunction bipolar transistors and said switches comprise field-effect transistors, said broadband components and said switches formed in a single integrated circuit.

9. The RF transceiver as defined by claim 1, wherein said modulator and said variable gain amplifier include heterojunction bipolar transistors and said switch comprises a field-effect transistor, said transistors formed in a single integrated circuit.

10. The RF transceiver as defined by claim 1 wherein said modulator and said variable gain amplifier have a flat frequency response over a range including 800–2000 MHz frequency.

11. In an RF transceiver operable in at least two separate frequency bands, a receiver comprising:
    an antenna;
    a low noise amplifier for amplifying a transmitted signal received by said antenna;
    a first bandpass filter tuned to a first frequency band;
    a second bandpass filter tuned to a second frequency band;
    a mixer for receiving signals from said first bandpass filter and from said second bandpass filter and providing an IF frequency signal;
    IF tuned detector circuitry for receiving and detecting signals from said mixer;
    a first RF switch for selectively applying an amplified signal from said low noise amplifier to said first bandpass filter and to said second bandpass filter depending on frequency band of the amplified signal; and
    a second RF switch for selectively applying signals from said first and second bandpass filters to said mixer, said low noise amplifier and said mixer comprising broadband components with a flat frequency response across both of said first frequency band and said second frequency band.

12. The receiver as defined by claim 11, wherein said broadband components include heterojunction bipolar transistors and said switches comprise field-effect transistors formed in a single integrated circuit.

13. The RF transceiver as defined by claim 11 and further including first and second antennas, and a third RF switch for selectively applying signals from said first and second antennas to said low noise amplifier.

14. The RF transceiver as defined by claim 11 wherein said low noise amplifier and said mixer have a flat frequency response across a frequency range including 800–2000 MHz frequency.

* * * * *